United States Patent [19]

Wiklund et al.

[11] Patent Number: 4,560,270
[45] Date of Patent: Dec. 24, 1985

[54] DEVICE INCLUDED IN A DISTANCE METER SYSTEM

[75] Inventors: Klas R. Wiklund, Täby; Mikael Hertzman, Sollentuna, both of Sweden

[73] Assignee: Geotronics AB, Sweden

[21] Appl. No.: 693,837

[22] Filed: Jan. 24, 1985

Related U.S. Application Data

[63] Continuation of Ser. No. 399,084, Jul. 16, 1982, abandoned.

[30] Foreign Application Priority Data

Aug. 7, 1981 [SE] Sweden .................................. 8104743

[51] Int. Cl.$^4$ .......................... G01C 3/08; G01C 1/00; G01B 11/26
[52] U.S. Cl. ...................................... 356/5; 356/141; 356/152; 455/605; 455/617
[58] Field of Search ..................... 455/605, 617; 356/4, 356/5, 141, 152

[56] References Cited

U.S. PATENT DOCUMENTS

| | | |
|---|---|---|
| 2,607,916 | 8/1952 | Albersheim . |
| 3,460,139 | 8/1969 | Rittenbach . |
| 3,662,180 | 5/1972 | Jorgensen et al. .................. 356/152 |
| 3,680,958 | 8/1972 | Von Bose ............................. 356/5 |
| 4,131,791 | 12/1978 | Lego .................................... 455/605 |
| 4,143,263 | 3/1979 | Eichweber ......................... 332/7.51 |
| 4,355,894 | 10/1982 | Maeda ................................. 455/605 |

FOREIGN PATENT DOCUMENTS

| | | |
|---|---|---|
| 2521067 | 12/1975 | Fed. Rep. of Germany .......... 356/5 |
| 2723584 | 11/1978 | Fed. Rep. of Germany .......... 356/5 |
| 33-04239 | 5/1958 | Japan . |
| 50-10507 | 2/1975 | Japan . |

*Primary Examiner*—S. C. Buczinski
*Attorney, Agent, or Firm*—Pollock, Vande Sande and Priddy

[57] ABSTRACT

An electronic distance meter which makes a distance measurement by phase comparison between measuring signals modulated on an emitted light beam and on a received light beam reflected from a target is provided with a microphone, an amplifier and an extra modulation circuit, which modulates audible information on the measuring signal of the distance meter. A receiver provided with a detector sensible for the optical wavelength region of the emitted light beam is mounted at a reflecting prism mounted at the target. The receiver at the prism is provided with circuits for detecting the audible information modulated on the measuring signal and a loud speaker or an ear phone. At a receiver of the distance meter the audible information is filtered out from the received measuring signal before distance calculation is made by internal circuits of the instrument.

11 Claims, 1 Drawing Figure

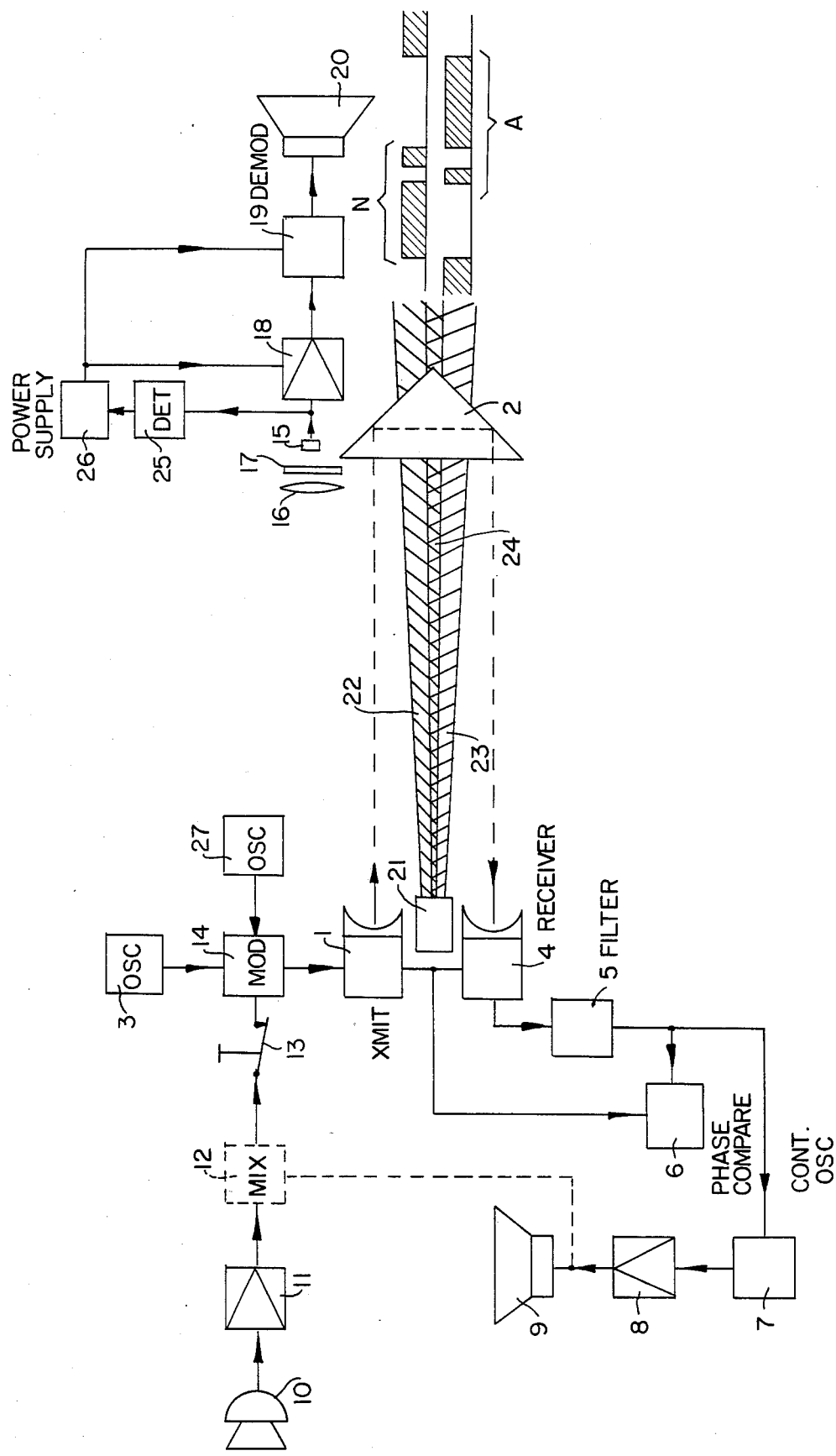

DEVICE INCLUDED IN A DISTANCE METER SYSTEM

This is a continuation of co-pending application Ser. No. 399,084 filed on July 16, 1982, now abandoned.

BACKGROUND OF THE INVENTION

The present invention relates to a device included in a distance meter system for transmitting audible information from an electronic distance meter to an operator placed at a reflector, such as a cube corner prism, towards which a distance measurement is to be made. The electronic distance meter is of the kind which has a transmitter, which emits a continuous measuring signal towards the reflector. The signal is in the form of an electromagnetic radiation, onto which a periodic signal is modulated. The distance meter includes a receiver, which receives the modulated radiation reflected by the reflector.

Electronic distance meters of phase comparison type measure the distance to a target by comparing the phase between the modulated signals on a transmitted, modulated light beam and on the light beam, which is received after reflection from the target. The light beam is modulated with a high frequency periodic signal, which most often is sinusoidal or a square wave signal. Common frequences for this modulating signal are ca 15 MHz and 150 kHz or 30 MHz and 300 kHz. Most distance meters of this type make measurements towards a reflector placed on the target, such as a cube corner prism or the like.

Gauging for staking out land, such as boundaries or the like, by the aid of an electronic distance meter (EDM) is usually made by placing a distance measuring instrument provided with the electronic distance meter on the land. A first measurement operation is made towards reference points having known positions. From the result of these measurements the exact position of the distance measuring device is calculated. Thereafter the acutal staking out is made. An operator stands by the distance measuring instrument and commands an operator, who carries a rod provided with a prism, to place the rod with the prism at a predetermined spot, determined by the boundaries of the land. The distance between the instrument and the spot, where the prism shall be placed, are sometimes long. The communication from the instrument operator to the prism operator is usually made by the aid of so called Walkie Talkies ®.

A Walkie Talkie ® is principally a system of a radio transmitter and a radio receiver. The communication is transmitted as information modulated on a carrier. In cities and other densely populated regions use of such instrumentation is often problematic to, since congestion is very high at those frequencies which are allowed to be used. In some countries transmitter/receiver units of this kind are not even allowed. If Walkie Talkies ® are used for communication from one operator to another working with a distance measuring equipment this also means that the operators outside the equipment must have separate units, which have to be handled in addition to other equipment necessary for the measurement.

SUMMARY OF THE INVENTION

A principle object of the invention is to transmit audible information from the distance meter to a prism operator without the need for an extra equipment such as a Walkie Talkie ®. The audible information shall not to a considerable extent have a deleterious effect on the measurement result of a distance measurement made by the distance meter at the same time as a transmission of audible information.

SUMMARY

A further object is to have an audible transmission as noiseless as possible.

A still further object is to give the prism operator an aid in directing the prism to an optimal extent.

Additional objects and advantages of the invention will be set forth in part in the description which follows. To achieve the foregoing objects and in accordance with the purpose of the invention, as embodied and broadly described herein, the distance meter is provided with a microphone and circuits, which modulate the microphone signal upon the periodic measuring signal, which in turn is modulated on the emitted light beam. At the reflector a receiver is mounted within the region which is hit by the radiation emitted from the distance meter transmitter. The receiver includes circuits for detecting the audiofrequency information modulated on the measuring signal, amplifiers and an acoustic link, such as a loud speaker, an earphone or the like. It is to be noted that measurements can be made at will at every instant with the aid of the measuring signal, because in the distance meter the audio modulation is filtered out from the received signal by ordinary band pass filter circuits through which a received signal passes before it reaches the distance calculating circuits.

These and other objects and advantages of the present invention will become apparent from the following detailed description and drawing, in which the FIGURE shows a block diagram of an embodiment of the invention.

DESCRIPTION OF THE PREFERRED EMBODIMENT

The FIGURE shows a block diagram of an electronic distance meter provided with the device in accordance with the invention.

A transmitter 1 emits modulated, collimated electromagnetic radiation towards a reflector 2, which preferably is a cube corner prism. The radiation source in the transmitter may for instance be a glow lamp, a laser, preferably of HeNe-type, or a light emitting diode, which emits light within the infrared radiation region. A periodic signal, which most often is a sinusoidal or a square wave, and which has a frequency, which preferably lies within the interval 0.1 to 30 MHz, is generated by an oscillator 3 and is fed to the transmitter in order to modulate the emitted radiation beam.

The signal reflected by the reflector 2 is received by a receiver 4 and is fed to distance calculating circuits 6 via a filter 5, which preferably is a band pass filter. A high pass filter may also be used. A signal corresponding to the modulation on the emitted beam is also fed to the circuits 6. The circuits 6 compare the phase of the modulation on the emitted beam and the phase of the modulation on the received beam. The distance is calculated from the phase difference.

The signal from the filter 5 is also fed to a circuit 7, which indicates the signal intensity of the received signal. The output of the circuit 7 is a tone signal of frequency directly related to the received signal intensity. The output tone signal is amplified in an amplifier 8 and is fed to a loud speaker 9. A circuit including the elements 7 to 9 is described in the Swedish Pat. No. 7407387-5. All the elements mentioned above are standard components in an electronic distance meter.

In accordance with the invention the distance meter is provided with a microphone 10, the output of which is amplified in an amplifier 11. Sometimes the signal needs to be changed or mixed with another signal before it is modulated on the measuring signal. Therefore, the output of the amplifier 11 may be fed to the modulator 14 via a signal processing circuit 12. The circuit 12 may for instance be a mixer with two inputs. To the first input the amplified microphone signal is fed. To the second input a signal is fed directly from the circuit 8 in the unit 7 to 9, which signal indicates the intensity of the received measuring signal.

The signal from the microphone circuits 10 to 12 is fed to the modulator 14 via a switch 13, which is controllable from outside the instrument. The signal from the oscillator 3 is fed to a second input of the modulator 14. Preferably, a second oscillator 27 is connected to a third input of the modulator 14. The oscillator 27 has a frequency in the order of 30 to 60 kHz. The audiofrequency signal from the circuits 10 to 13 is frequency, phase or pulse code modulated onto the output signal from the second oscillator. The signal modulated in this way is then amplitude modulated on the measuring signal from the oscillator 3. A degree of modulation suitable for this application lies between 5% and 50% of the measuring signal amplitude. Thus, the measuring signal of the instrument is modulated before it is fed to the transmitter 1 to be modulated in turn on the emitted radiation beam. One purpose of having a twostep modulation of the measuring signal is to have a transmission as noiseless as possible of audible information to the receiver at the reflector. If only amplitude modulation of the information was made the received signal would be very noisy because of the influence of air turbulence on a transmitted light signal. Another purpose of having this twostep modulation is to have a modulation on the measuring signal, that does not influence the phase of the measuring signal. The light signal reflected by the cube corner prism is recieved by the receiver of the distance meter and shall be used to calculate the distance even though an audible information is modulated on the measuring signal. The received signal is always amplitude limited before a phase comparison in relation to the transmitted signal is made by the distance calculating circuits 6. In order to filter out frequencies at the side of the measuring signal frequency the received signal is also fed through a band pass or a high pass filter 5. This filter is also a standard element in a distance meter.

In using the above mentioned type of modulation it is possible to make distance measurements at the same time as the signals from the microphone and from the tone circuits 7, 8 are modulated on the emitted modulated beam without having a serious disadvantageous influence of the audible information modulation on the distance measuring results. It is however true that some influence from this information never can be completely avoided that the resolution of the instrument is slightly deteriorated while the feature of having an audible transmission is in use. When fine resolution is desired the signal from the circuits 10 to 12 is broken by a manually controllable switch 13 between the circuits 12 and 14.

Other forms of modulation with the purpose of creating a modulation, which easily can be filtered out from the signal received by the instrument, so that distance measurements can be made at the same time as a transmission of audible information to the prism, are possible as well.

A light detector 15 is mounted at the reflector 2. The detector 15 is placed within the region, which is hit by the relatively narrow radiation beam from the transmitter 1 of the distance meter. In front of the detector 15 a collector lens 16 is situated together with an optical filter 17, which suppresses radiation having wavelengths not within the wavelength band emitted by the transmitter 1. Preferably, the lens is a Fresnel lens in order to be as thin and light as possible.

The output of the detector 15 is amplified in an amplifier 18 and is demodulated in a demodulator 19. The output of the demodulator 19 is fed to a loud speaker or an earphone 20.

In the FIGURE a unit 21 known per se is shown, which is placed below or above the transmitter/receiver unit of the electronic distance meter. The unit is emitting two light beams 22 and 23 in essentially the same direction as the radiation beam from the distance meter. Both light beams 22 and 23 are emitted horizontally side by side, are slightly diverged and have mutually different characters. In a central zone 24 the two light beams are overlapping. In accordance with an appropriate embodiment the two light beams are modulated with mutually complementary pulsetrain signals having a blinking frequency, which is easily identifiable for a human eye. As is usually the case within the technical field regarding directed radio beacons the first beam can have the Morse signal A modulated on the beam and the second beam the Morse signal N. The pulse length of the A is the same as the pulse separation of the N and vice versa, as is apparent from the right side of the FIGURE at the side of the two light beams.

The device in accordance with the invention works in the following way. When the staking out shall take place the distance measuring instrument including the electronic distance meter is directed in a predetermined direction pointing from the instrument towards a first spot, which is determined by the wanted position for a staking pole. The prism operator takes the rod with the prism and walks in the pointing direction of the instrument over a distance, which he estimates as being roughly the right distance to the spot, where he shall place the rod with the prism.

When he has arrived to the estimated spot he looks at the instrument and moves so that he comes within the area 24 of the emitted beams 22 and 23, within which area the light from the unit 21 shows a constant and not blinking light. Within this area he puts down the rod provided with the prism and moves the prism vertically until it comes within the area, which is hit by the measuring beam from the instrument. A part of the measuring beam will then impinge upon the detector 15. Transmission of speech and other audio signals from the instrument to the prism operator is now possible. In fact the prism operator can decide when the prism has come within the measuring beam in that he hears an audible signal from the loud speaker 20.

The instrument operator can now audibly instruct the prism operator. The first operation, that the prism operator shall carry out, is to adjust the prism so that the instrument is provided with the highest possible reflected signal from the prism. The unit 7, 8 and 9 provides a tone signal, which has a higher frequency the better adjusted the prism is. The microphone 10 (or the circuit 12 via an inner path in the instrument) picks up this tone and it is transmitted to the prism circuits 15 to 20 through the measuring signal. Thus, the prism operator can hear the adjustment signal from the instrument. When the prism is properly adjusted a distance measurement is made. If the distance obtained at the measurement did not correspond to the desired one, the instrument operator orders the prism operator to move towards or from the instrument, and the distance measurement is made over again. As long as the prism operator moves the rod stepwise ordered by the instrument operator in order to find the exact staking out point for the boundary the distance measurements can be made at the same time as an audible information can be transmitted to the prism circuits 18 to 20.

However, when the operators believe that the prism rod is placed at the boundary a final distance measurement shall be made. In order to have the most accurate result from this measurement the instrument operator momentarily opens the normally closed switch 13 in order to prevent the audio signal from the circuits 10 to 12 to reach the modulator 14 and thus prevent any signal modulated on the measuring signal to cause even a slight disturbance of the final distance measurement.

It is to be noted that transmission of audible information from the instrument to the prism only can be made as long as the prism is placed within the measuring beam from the instrument. Thus, at the operations including set ups and movements of the prism mentioned above there are long times, when the prism is not within the measuring beam. During these times it is not necessary to let the detector circuits 18 to 20 have a voltage supply. Therefore, the magnitude of the output of the detector 15 is detected by a circuit 25, which controls the voltage supply 26 so that the detector circuits 18 to 20 have a voltage supply only when the magnitude of the output from the detector reaches above a predetermined level. In this way the prism operator does not have to think of that he must switch off the detector circuits between the different staking out operations in order to economize on the batteries. This is made automatically. Thus, the optical filter 17 has for its special purpose to prevent radiation of other kinds than a radiation which has a wavelength lying very closely around the wavelength band of the measuring beam radiation from acting upon the detector 15, so that radiation from the surroundings does not result in such a high output signal from the detector that the voltage supply 26 will supply the circuits 18 to 20 when the prism is carried around and thus is not put up for a measurement operation.

Many modifications can be made within the scope of the invention. For example some other type of tone signal source than the circuits 7 to 9 may be used. The only demand on this circuit is that it shall give a loud signal, which in a clearly perceivable way indicates changes of the intensity of the signal received by the receiver 4. It is also possible to use another type of direction indication unit 21 and then for instance a unit which shows one kind of colour, if the operator is situated too far at one side of the central field 24 and another colour when he is situated too far at the other side of the field 24 and a mixture of the colours when he is situated in the field.

We claim as our invention:

1. An improved optical electronic distance measuring system including an operator positioned optical reflector and a transmitter/receiver for transmitting electromagnetic radiation in the visible or infrared wavelength region, modulated by a continuous periodic measuring signal, towards said optical reflector and for receiving modulated radiation reflected by said optical reflector, said transmitter/receiver further including distance circuit means for deriving a distance measurement, representative of the distance between said transmitter/receiver and said optical reflector, from a phase difference between said measuring signals modulated onto said transmitted and received radiation, characterized in that:

said transmitter/receiver includes first modulator means (14,27) with a first input connected to a source of an audible information signal (10, 11 or 7-9) and a second input connected to a source of said continuous periodic measuring signal, said modulator means modulating said audible information signal from said source onto said continuous periodic measuring signal, said transmitter/receiver further includes filter means (5) to filter said audible information signal from a received signal produced from said received radiation before said received signal is coupled to said distance circuit means, and an optical receiver (16-20) located adjacent said optical reflector (2) for responding to said transmitted radiation, said optical receiver including an optical or infrared detector (15) and demodulator circuit means (19) for demodulating an audible signal from said transmitted radiation, wherein said first modulator means includes an auxiliary oscillator providing an auxiliary carrier and second modulator means for frequency, phase, or pulse code modulating said audible information signal onto said auxiliary carrier and amplitude modulating said modulated auxiliary carrier onto said continuous periodic measuring signal.

2. A device according to claim 1, characterized in that said detector is sensitive only for a limited radiation region around the wavelength region of said transmitted radiation, and in that said demodulator circuit means include a sensor circuit sensing the magnitude of the radiation received by said detector and controlling a voltage supply for said demodulator circuit means to feed voltage supply to them, only if said magnitude is higher than a predetermined value.

3. A device according to claim 2, characterized in that a narrow optical band pass filter is placed in front of said detector.

4. A device according to claim 1, characterized in that said detector at said reflector and associated optics is unitized with said reflector.

5. A device according to claim 1, characterized in that a Fresnel lens is placed in front of said detector.

6. A device according to claim 1 characterized in that said distance measuring system includes means for giving an audio frequency signal having a clearly perceivable, continuous difference for different signal strengths of said radiation received by said transmitter/receiver, and that said audio frequency signal either directly via an inner path in said transmitter/receiver or via a loudspeaker in a microphone is modulated on said measuring signal.

7. An improved optical electronic distance measuring system including an operator positioned optical reflector and a transmitter/receiver for transmitting electromagnetic radiation in the visible or infrared wavelength region, modulated by a continuous periodic measuring signal, towards said optical reflector and for receiving modulated radiation reflected by said optical reflector, said transmitter/receiver further including distance circuit means for deriving a distance measurement, representative of the distance between said transmitter/receiver and said optical reflector, from a phase difference between said measuring signals modulated onto said transmitted and received radiation, characterized in that:

said transmitter/receiver includes first modulator means (14, 27) with a first input connected to a source of an audible information signal (10, 11 or 7–9) and a second input connected to a source of said continuous periodic measuring signal, said modulator means modulating said audible information signal from said source onto said continuous periodic measuring signal, said transmitter/receiver further includes filter means (5) to filter said audible information signal from a received signal produced from said received radiation before said received signal is coupled to said distance circuit means, and an optical receiver (16–20) located adjacent said optical reflector (2) for responding to said transmitted radiation, said optical receiver including an optical or infrared detector (15) and demodulator circuit means (19) for demodulating an audible signal from said transmitted radiation, wherein said source of an audible information signal includes means for giving an audio frequency signal having a clearly perceivable, continuous difference for different signal strengths of said radiation received by said transmitter/receiver, and that said audio frequency signal either directly via an inner path in said transmitter/receiver or via a loudspeaker and a microphone is modulated on said measuring signal.

8. A device according to claim 7, characterized in that said detector is sensitive only for a limited radiation region around the wavelength region of said transmitted radiation, and in that said demodulator circuit means includes a sensor circuit sensing the magnitude of the radiation received by said detector and controlling a voltage supply for said demodulator circuit means to feed voltage supply to them, only if said magnitude is higher than a predetermined value.

9. A device according to claim 8, characterized in that a narrow optical band pass filter is placed in front of said detector.

10. A device according to claim 7, characterized in that said detector at said reflector and associated optics is unitized with said reflector.

11. A device according to claim 7, characterized in that a Fresnel lens is placed in front of said detector.

* * * * *